United States Patent
Liu

(10) Patent No.: US 10,027,794 B2
(45) Date of Patent: Jul. 17, 2018

(54) FLIGHT MODE CONTROL METHOD AND MOBILE TERMINAL

(71) Applicant: Guangdong Oppo Mobile Telecommunications Corp., Ltd., Dongguan (CN)

(72) Inventor: Hai Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 15/323,436

(22) PCT Filed: Mar. 23, 2016

(86) PCT No.: PCT/CN2016/077078
§ 371 (c)(1),
(2) Date: Jan. 3, 2017

(87) PCT Pub. No.: WO2016/173341
PCT Pub. Date: Nov. 3, 2016

(65) Prior Publication Data
US 2017/0163794 A1    Jun. 8, 2017

(30) Foreign Application Priority Data

Apr. 30, 2015   (CN) .......................... 2015 1 0221115

(51) Int. Cl.
*H04M 3/00*   (2006.01)
*H04M 1/725*   (2006.01)
(Continued)

(52) U.S. Cl.
CPC ... *H04M 1/72577* (2013.01); *H04M 1/72525* (2013.01); *H04M 1/72572* (2013.01);
(Continued)

(58) Field of Classification Search
CPC ............. H04W 76/007; H04W 76/028; H04W 76/045
(Continued)

(56) References Cited

U.S. PATENT DOCUMENTS

| 2010/0052899 | A1 | 3/2010 | Bruce |
| 2014/0106699 | A1* | 4/2014 | Chitre ................. H04W 76/007 455/404.1 |

(Continued)

FOREIGN PATENT DOCUMENTS

| CN | 101577764 A | 11/2009 |
| CN | 102204122 A | 9/2011 |

(Continued)

*Primary Examiner* — Joseph Arevalo
(74) *Attorney, Agent, or Firm* — JMB Davis Ben-David

(57) ABSTRACT

A method of controlling a flight mode is proposed. The method includes: receiving a flight mode trigger command when a mobile terminal is connected to the 2G network in data transmission and voice call; sending a voice call interruption command to a modem in the mobile terminal in response to the flight mode trigger command so as to interrupt the voice call with the modem; receiving a voice call interruption message sent by the modem and sending a request to the modem to deactivate a PDP; and sending a flight mode enabling command to the modem upon receiving a message from the modem notifying the PDP is successful deactivated, so that the modem enables a flight mode of the mobile terminal.

12 Claims, 5 Drawing Sheets

(51) Int. Cl.
*H04W 76/06* (2009.01)
*H04W 48/04* (2009.01)
*H04W 76/32* (2018.01)

(52) U.S. Cl.
CPC ......... *H04W 48/04* (2013.01); *H04W 76/062* (2013.01); *H04W 76/32* (2018.02)

(58) Field of Classification Search
USPC ... 455/419, 414.1, 426.1, 404.1, 466, 456.1, 455/456.5, 418, 436, 456.6, 421, 435.3
See application file for complete search history.

(56) References Cited

U.S. PATENT DOCUMENTS

| | | |
|---|---|---|
| 2014/0282003 A1 | 9/2014 | Gruber et al. |
| 2015/0049884 A1 | 2/2015 | Ye |

FOREIGN PATENT DOCUMENTS

| | | |
|---|---|---|
| CN | 104427099 A | 3/2015 |
| CN | 104427112 A | 3/2015 |
| CN | 104935732 A | 9/2015 |
| WO | 2014168730 A2 | 10/2014 |

\* cited by examiner

FLIGHT MODE CONTROL METHOD AND MOBILE TERMINAL

CROSS REFERENCE TO RELATED APPLICATION

This is the U.S. National Stage of International Application No. PCT/CN2016/077078, filed on Mar. 23, 2016, which claims priority to Chinese Application No. 201510221115.8, filed Apr. 30, 2015. The entire disclosures of the above applications are incorporated herein by reference.

BACKGROUND

1. Field of the Disclosure

The present disclosure relates to the communication technique, and more particularly, to a method of controlling a flight mode and a mobile terminal using the method.

2. Description of the Related Art

With the rapid development of scientific techniques, nearly everybody has mobile phones. The users can call, send messages, take photos, purchase, etc. with their mobile phones. In other words, mobile phones have become one part of everyone's daily life. Mobile phones need to be switched to a flight mode in some occasions. When passengers are on board with their mobile phones, they have to turn off the mobile phones or switch to a flight mode of the mobile phone, so as to ensure the flight safety through a disconnection of the mobile phones from the external environment.

In the conventional technology, when a user uses an Android mobile phone with the 2G network data connection to call, and, at the same time turns on the flight mode during the phone call conversation, the operating system of the mobile phone sends the flight mode enabling command to a modulator and demodulator (herein used as modem). After receiving the flight mode enabling command, the modem tries to the deactivation of a packet data protocol (PDP). However, the communication resources are occupied by the voice call, so the deactivation of the PDP fails. The modem tries to perform the deactivation several times afterwards (the deactivation of the PDP takes about five seconds in the conventional technology) until the predetermined times have been reached. Afterwards, the modem automatically turns off the voice call so as to deactivate the PDP successfully. After the PDP is deactivated successfully, the flight mode is turned on again. The conventional method of turning on the flight mode takes much more time with lower efficiency.

SUMMARY

An object of the present disclosure is to propose a method of controlling the flight mode and a mobile terminal using the method to enhance the efficiency of enabling the flight mode so that the mobile phone can enter the flight mode immediately.

In a first aspect of the present disclosure, a method of controlling a flight mode is proposed. The method includes:
a flight mode trigger command is received when a mobile terminal is connected to the second generation (2G) network in data transmission and voice call;
a voice call interruption command is sent to a modulator and demodulator (modem) in the mobile terminal in response to the flight mode trigger command so as to interrupt the voice call with the modem;
a voice call interruption message sent by the modem is received and sending a request to the modem to deactivate a packet data protocol (PDP); and
a flight mode enabling command to the modem is sent upon receiving a message from the modem notifying the PDP is successful deactivated, so that the modem enables a flight mode of the mobile terminal.

According to an embodiment in conjunction to the first aspect of the present disclosure, an operating system installed in the mobile terminal is Android operating system or any systems developed based on the Android operating system.

According to an embodiment in conjunction to the first aspect of the present disclosure, when a voice call interruption command is sent to a modulator and demodulator (modem) in the mobile terminal in response to the flight mode trigger command so as to interrupt the voice call with the modem, the method includes:
a voice call turn-off command is prompted to be inputted in response to the flight mode trigger command;
the voice call turn-off command is received and the voice call interruption command is sent to the modem in the mobile terminal in response to the voice call turn-off command so as to interrupt the voice call with the modem.

According to an embodiment in conjunction to the first aspect of the present disclosure, when a voice call interruption message sent by the modem is received and a request to the modem to deactivate a packet data protocol (PDP) is sent, the method includes:
the voice call interruption message sent by the modem is received;
a network disabling command is prompted to be inputted;
the input network disabling command is received and the request to the modem to deactivate the PDP is sent in response to the network disabling command.

According to an embodiment in conjunction to the first aspect of the present disclosure, before the flight mode trigger command is received, the method further includes:
a geographical location of the mobile terminal is obtained;
it is determined whether the geographical location is a predetermined airport location. If the mobile terminal is within a range of an airport, that the flight mode trigger command is received is performed.

In a second aspect of the present disclosure, a mobile terminal is proposed. The mobile terminal includes:
a first receiving unit, configured to receive a flight mode trigger command when the mobile terminal which accesses to the 2G network is in data connection and voice call communication;
a responding unit, configured to send a voice call interruption command to the modulator and demodulator (modem) in the mobile terminal to interrupt the voice call with the modem in response to the flight mode trigger command;
a second receiving unit, configured to receive the voice call interruption message from the modem and to send a request to the modem to deactivate a packet data protocol (PDP); and
a transmitting unit, configured to send a flight mode enabling command to the modem so that the modem enables the flight mode of the mobile terminal upon receiving the message from the modem notifying that the PDP is successfully deactivated.

According to an embodiment in conjunction to the second aspect of the present disclosure, an operating system installed in the mobile terminal is Android operating system or any systems developed based on the Android operating system.

According to an embodiment in conjunction to the second aspect of the present disclosure, the responding unit includes:

a first responding sub-unit, configured to prompt to input the voice call turn-off command in response to the flight mode trigger command; and a second responding sub-unit, configured to send the voice call interruption command to the modem in the mobile terminal to interrupt the occupied voice call with the modem in response to the voice call turn-off command which has been received by the second responding sub-unit.

According to an embodiment in conjunction to the second aspect of the present disclosure, the second receiving unit includes:

a first receiving sub-unit, configured to receive the voice call interruption message sent by the modem;

a prompting sub-unit, configured to prompt to input a voice call turn-off command; and a second receiving sub-unit, configured to receive a network disabling command and to send a request of deactivating the PDP to the modem in response to the network disabling command received thereby.

According to an embodiment in conjunction to the second aspect of the present disclosure, the mobile terminal further includes:

an obtaining unit, configured to obtain a geographical location of the mobile terminal; and a comparison unit, configured to determine whether the geographical location is a predetermined airport location, and to receive the flight mode trigger command when the mobile terminal which accesses to the 2G network is in data connection and voice call communication upon a condition that the mobile terminal is within a range of the predetermined airport.

In a third aspect of the present disclosure, a mobile terminal including an input device, an output device, a memory, and a processor is proposed. The processor executes program instructions stored in the memory to perform operations of:

a flight mode trigger command is received with the input device, when a mobile terminal which is connected to the second generation (2G) network is in data transmission and voice call communication;

a voice call interruption command is sent to a modulator and demodulator (modem) in the mobile terminal by using the output device, in response to the flight mode trigger command so as to interrupt the voice call with the modem;

receiving a voice call interruption message sent by the modem by using the input device, and a request is sent to the modem to deactivate a packet data protocol (PDP) by using the output device; and a flight mode enabling command is sent to the modem by using the output device upon receiving a message from the modem notifying the PDP is successful deactivated, so that the modem enables a flight mode of the mobile terminal.

According to an embodiment in conjunction to the third aspect of the present disclosure, an operating system installed in the mobile terminal is Android operating system or any systems developed based on the Android operating system.

According to an embodiment in conjunction to the third aspect of the present disclosure, when the processor executes the program instructions to perform the operation of sending a voice call interruption command to a modulator and demodulator (modem) in the mobile terminal in response to the flight mode trigger command so as to interrupt the voice call with the modem, the processor executes the program instructions to:

prompt to input a voice call turn-off command in response to the flight mode trigger command;

receive the voice call turn-off command with the input device, and send the voice call interruption command to the modem in the mobile terminal with the output device in response to the voice call turn-off command so as to interrupt the voice call with the modem.

According to an embodiment in conjunction to the third aspect of the present disclosure, when the processor executes the program instructions to perform the operation of receiving a voice call interruption message sent by the modem and sending a request to the modem to deactivate a packet data protocol (PDP), the processor executes the program instructions to:

receive the voice call interruption message sent by the modem with the input device;

prompt to input a network disabling command;

receive the input network disabling command with the input device, and to send the request to the modem to deactivate the PDP with the output device in response to the network disabling command.

According to an embodiment in conjunction to the third aspect of the present disclosure, before the operation of receiving the flight mode trigger command, the processor executes the program instructions to:

obtain a geographical location of the mobile terminal; and determine whether the geographical location is a predetermined airport location; if the mobile terminal is within a range of an airport, the operation of receiving the flight mode trigger command with the input device being performed.

According to the embodiments of the present disclosure, the flight mode trigger command is received when the mobile terminal which is connected to the 2G network is in data and voice call communication. At first, the modem is asked by the operating system to cancel the conversation immediately. Next, after the interruption of the network data is assured, the flight mode enabling command is sent to the modem through the operating system so that the modem can turn on the flight mode of the mobile terminal. In this way, the speed of enabling the flight mode is efficiently enhanced.

Further, the location of the mobile terminal via the positing system installed in the mobile terminal is obtained before the user's flight mode trigger command is received. Only when that the mobile terminal is within the range of the airport is determined, the flight mode is turned on immediately. In this way, the user's experience is improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE
PREFERRED EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the invention.

The terminology used herein is for the purpose of describing particular embodiments only and is not intended to be limiting of the invention. As used herein, the singular forms "a", "said" and "the" are intended to include the plural forms as well, unless the context clearly indicates otherwise. It will be understood that the term "and/or," when used in this specification, specify one or more associated elements, alone or in combination, are provided. It will be further understood that the terms "first," "second," "third," and "fourth," when used in this specification, claim and drawings, are used to distinguish different objects, rather than to describe a specific order. It will be further understood that the terms "comprises" and/or "comprising," when used in this specification, specify the presence of stated features, products, steps, operations, elements, and/or components, but do not preclude the presence or addition of one or more other features, products, steps, operations, elements, components, and/or groups thereof.

The claim and the specifications in this present disclosure introduce a mobile terminal performing the network communication function and the flight mode function (such as a mobile phone), or a mobile terminal including a plurality of mobile terminals performing the network communication function and the flight mode function (such as the system formed by iPod and iPod Touch).

Figure 1:
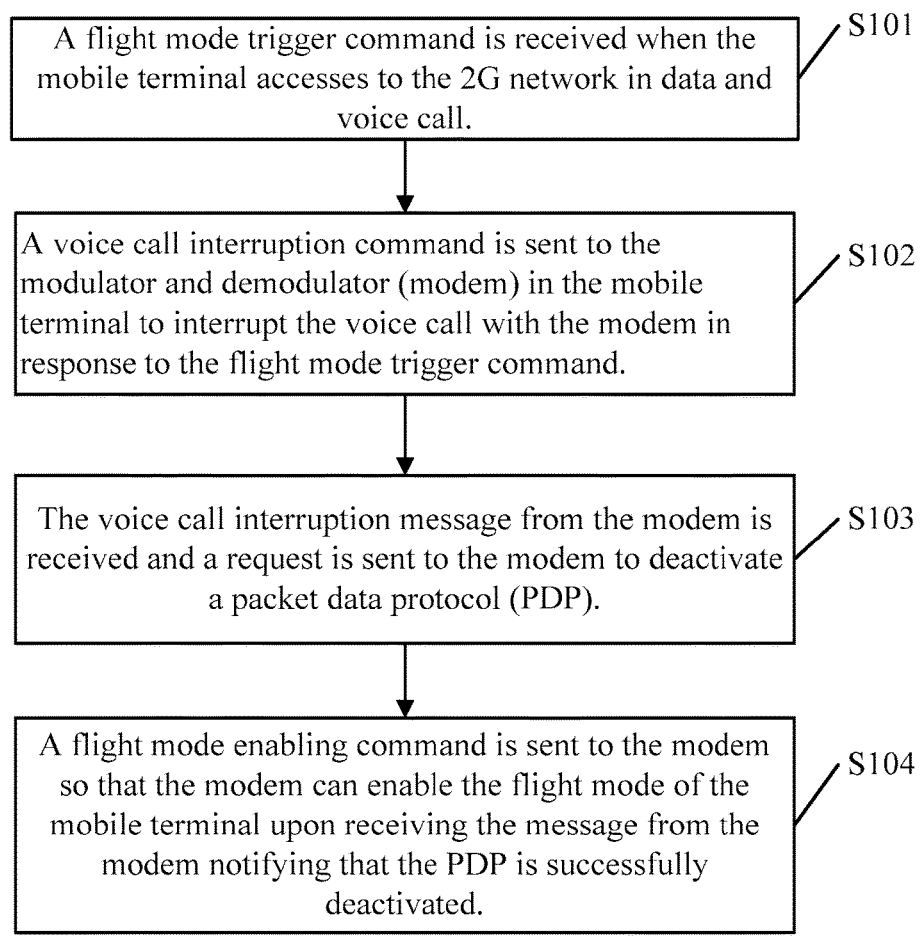
FIG. 1 is a flow chart illustrating a method of controlling a flight mode according to an embodiment of the present disclosure.

Please refer to FIG. 1. FIG. 1 is a flow chart illustrating a method of controlling a flight mode according to an embodiment of the present disclosure. The method includes, but is not limited to, following blocks:

Block S101: A flight mode trigger command is received when the mobile terminal accesses to the 2G network in data and voice call.

Specifically, the flight mode trigger command is completed in the operating system of the mobile terminal. With the second generation (2G) mobile communication technique, voice is digitally transmitted. In addition to the conversation function, the 2G mobile communication technique has a short message service (SMS) function. Some 2G network data also support data transmittance and fax but only for data with low transmittance, e.g. e-mails and small-size software, because of low speed. The method of accessing the network data with the 2G mobile communication technique includes but is not limited to an expenses card using the standard 2G network (such as the GSM card launched by China Mobile and China Unicom, and the CDMA card launched by China Telecom), an expenses card using the standard 3G network (such as the CDMA2000 card launched by China Telecom, the WCDMA card launched by China Unicom, and the TD-SCDMA card launched by China Mobile), 4G or other expenses cards with a more advanced communication technique to connect to the 2G network (the mobile phone is installed with the 2G network so that the higher standard 3G or 4G expenses cards can be connected to the 2G network). In addition, the 2G network can only be used in some remote or local areas. It costs much higher to establish the 3G or 4G network because few habitants are lived in these areas or these areas are naturally harsh.

A voice call includes daily communication connection via a telephone number or communication connection via similar principles. The flight mode trigger can be triggered by the user or automatically triggered once the relevant environmental data detected by the mobile terminal reaches a predetermined value. Take a mobile phone equipped with the Android mobile phone for example, when the mobile phone is at the bright-screen state, some systematic functional icons appears as the user scrolls down the touch screen from top to bottom. One of the icons is a flight-shaped icon. The user touches the icon to generate a flight mode trigger command. One the other hand, the mobile terminal is automatically triggered after the mobile terminal detects relevant environment parameters and a flight mode trigger command is generated.

It is noted that receiving the flight mode trigger mode is performed after the 2G network data connection is turned on and the mobile terminal is in phone call conversation. At one scene, during the 2G network enabling, the user calls someone on his/her phone (or answers the phone) directly before manually disabling the 2G network. At this time, the mobile terminal usually holds the 2G network data automatically. Specifically, the operating system instructs the modem to disable the 2G network but the operating system still labels the 2G network as enable. After the voice call is interrupted, the operating system enables the 2G network again immediately. Because the mobile phone is in conversation, the operating system still labels the 2G network as enable. So when the mobile phone is in conversation, the hold 2G network is connected. Afterwards, the user scrolls down the display screen without hanging up the mobile phone and touches the flight-shaped icon on the screen to generate a flight mode trigger mode. It is noted that, after receiving the flight mode trigger command, the operating system does not trigger the flight module enabling flight mode in the mobile terminal immediately. Instead, some preparations for the flight module enabling flight mode are done. The specific preparations refer to the following blocks.

Block S102: A voice call interruption command is sent to the modulator and demodulator (modem) in the mobile terminal to interrupt the voice call with the modem in response to the flight mode trigger command.

The operating system responds the flight mode trigger command. The modem in the mobile terminal 30 is an analog-to-digital converter (ADC) module. When the data is sent by the computer, the digital signal is converted into an analog signal through the modem, which is called a "modulation" process. Before the modulated signal is sent to another computer through a telephone carrier wave, the modem in the receiver needs to return the analog signal to a digital signal recognized by the computer, which is called a "demodulation" process. Through a conversion from digital signal to analog signal by modulation and another conversion from analog signal to digital signal by demodulation, a remote communication between the two computers is realized.

The modem in the mobile terminal (such as a mobile phone) is configured to control a wireless network communication module. For example, the modem controls connection and disconnection of the network, connection and disconnection of the voice call, and enablement and disablement of the flight mode. In block S102, after receiving the voice call interruption command sent by the operating system, the modem performs the voice call interruption and sends the message that interruption is successful to the operating system at the same time.

Block S103: The voice call interruption message from the modem is received and a request is sent to the modem to deactivate a packet data protocol (PDP).

Specifically, the packet data protocol (PDP) is deactivated in the Block S103. The voice call needs to be hung up before the PDP is successfully deactivated. The PDP fails to be deactivated whenever the modem asks the PDP to deactivate while the voice call is still turned on. Therefore, after a message notifying that the voice call is interrupted by the modem, a request of deactivating the PDP is sent to the modem.

Block S104: A flight mode enabling command is sent to the modem so that the modem can enable the flight mode of the mobile terminal upon receiving the message from the modem notifying that the PDP is successfully deactivated.

Specifically, if the PDP fails to be deactivated (that is, the PDP resources is not released), the modem fails to enable the flight mode. Therefore, after receiving the message notifying that the PDP is successfully deactivated, the flight mode enabling command is sent to the modem so that the modem can enable the flight mode for the mobile terminal. It is notified that, the flight mode is an operating mode that the mobile terminal does not communicate with the outside completely. Such a design aims to prevent the communication signal for the mobile terminal from bothering the flying airplane.

Preferably, the operating system adopted by the present disclosure is the Android operating system or any systems developed based on the Android operating system. The systems developed based on the Android operating system include, but are not limited to, the Mi operating system or the Meizu operating system. The Android operating system (or the systems developed based on the Android operating system) is a preferred embodiment. The iOS system or the Symbian system for the mobile terminal may be adopted in this present disclosure. The same or similar technical effects can be achieved. Any systems adopting the method proposed by the present disclosure can achieve the same or similar technical effects and be within the protective scope of the present disclosure.

Preferably, the block S102 providing that a voice call interruption command is sent to the modulator and demodulator (modem) in the mobile terminal to interrupt the voice call with the modem in response to the flight mode trigger command, includes following blocks.

Prompt to input the voice call turn-off command in response to the flight mode trigger command.

The voice call interruption command is sent to the modem in the mobile terminal to interrupt the occupied voice call with the modem in response to the voice call turn-off command.

These blocks remind the user of turning off the voice call. After the user agrees to turn off the voice call, the voice call interruption command is sent to the modem.

Further, the block S103 providing that the voice call interruption message from the modem is received and a request is sent to the modem to deactivate the packet data protocol (PDP), includes blocks as follows:

The voice call interruption message sent by the modem is received with an operating system.

Prompt the user to input a network disabling command with the operating system.

The network disabling command input by the user is received with the operating system, and a request of deactivating the PDP is sent to the modem in response to the network disabling command.

These blocks remind the user of turning off the network. After the user does agree to turn off the network, the request of deactivating the PDP is sent to the modem.

According to the method of controlling the flight mode as shown in FIG. 1, the user's flight mode trigger command is received when the mobile terminal is accessed to the 2G network in data and voice call. At first, the operating system instructs the modem to cancel the conversation immediately. Next, after the interruption of the network is assured, the flight mode enabling command is sent to the modem through the operating system so that the modem can turn on the flight mode of the mobile terminal. In this way, the speed of enabling the flight mode is efficiently enhanced.

Figure 2:
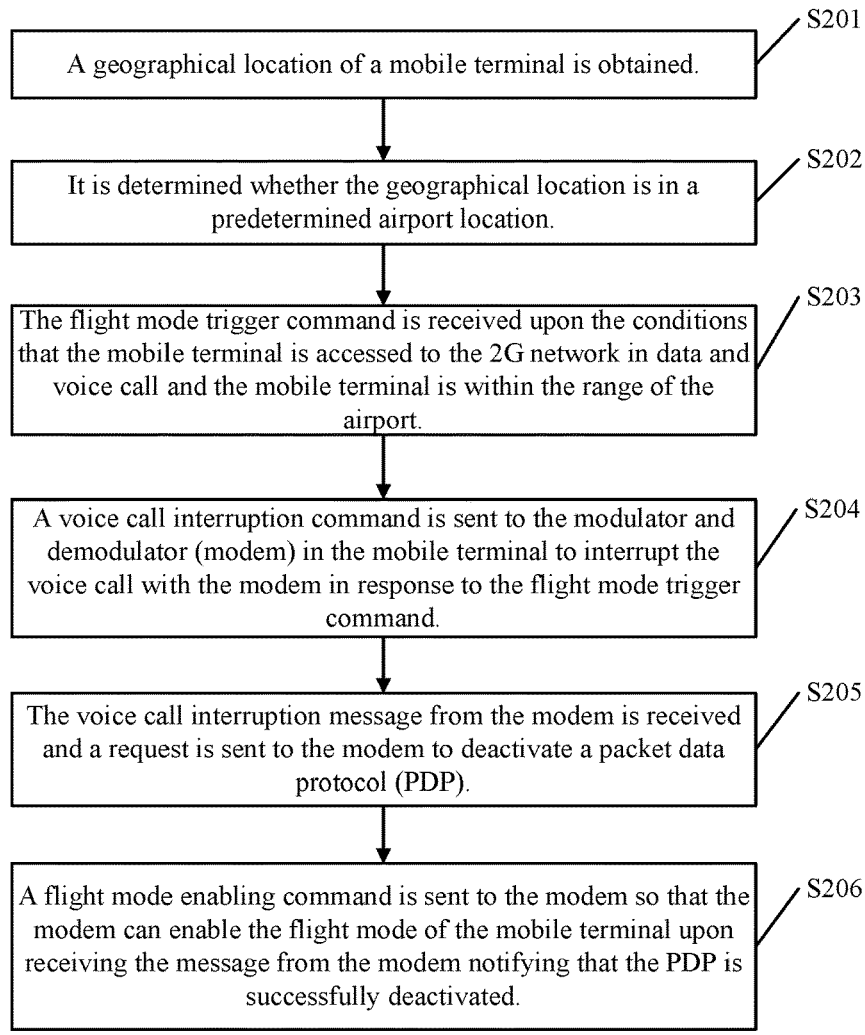
FIG. 2 is a flow chart illustrating a method of controlling another flight mode according to another embodiment of the present disclosure.

Please refer to FIG. 2. FIG. 2 is a flow chart illustrating a method of controlling another flight mode according to another embodiment of the present disclosure. The method includes, but is not limited to, following blocks.

Block S201: A geographical location of a mobile terminal is obtained.

The positioning system embedded in the mobile terminal, such as the global positioning system (GPS), the BeiDou navigation satellite system, and the Galileo positioning system, is turned on to obtain the information on the geographical location of the mobile terminal. The positioning system is automatically turned on with the mobile terminal. Or, the positioning system is turned on by the user after the user is prompted.

Before or after the positioning system is turned on, the mobile terminal is accessed to the 2G network and the voice call is in conversation. Yet, the mobile terminal 30 has to be accessed to the 2G network and in the voice call upon receiving the flight mode trigger command.

Block S202: It is determined whether the geographical location is in a predetermined airport location.

Specifically, by comparing the acquired location information with the predetermined geographical locations of the airports around the area, it is determined whether the mobile terminal is within the range of the airport.

Block S203: The flight mode trigger command is received upon the conditions that the mobile terminal is accessed to the 2G network in data and voice call and the mobile terminal is within the range of the airport.

Block S204: A voice call interruption command is sent to the modulator and demodulator (modem) in the mobile terminal to interrupt the voice call with the modem in response to the flight mode trigger command.

Block S205: The voice call interruption message from the modem is received and a request is sent to the modem to deactivate a packet data protocol (PDP).

Block S206: A flight mode enabling command is sent to the modem so that the modem can enable the flight mode of the mobile terminal upon receiving the message from the modem notifying that the PDP is successfully deactivated.

The realization of Block S203, Block S204, Block S205, and Block S206 can refer to the realization of Block S101, Block S102, Block S103, and Block S104 as illustrated in FIG. 1. So the blocks are not detailed here.

According to the method of controlling the flight mode as shown in FIG. 2, the user's flight mode trigger command is received when the mobile terminal is accessed to the 2G network in data and voice call. At first, the operating system instructs the modem to cancel the conversation immediately. Next, after the interruption of the network is assured, the flight mode enabling command is sent to the modem through the operating system so that the modem can turn on the flight mode of the mobile terminal. In this way, the speed of enabling the flight mode is efficiently enhanced.

Further, the location of the mobile terminal is obtained by means of the positing system installed in the mobile terminal before the user's flight mode trigger command is received. Only when that the mobile terminal is within the range of the airport is determined, the flight mode is turned on immediately. In this way, the user's experience is improved.

The method proposed by the present disclosure should have been fully elaborated. To make the method proposed by the present disclosure come true and be well applied, a mobile terminal adopting the method is also proposed by the present disclosure.

Figure 3:
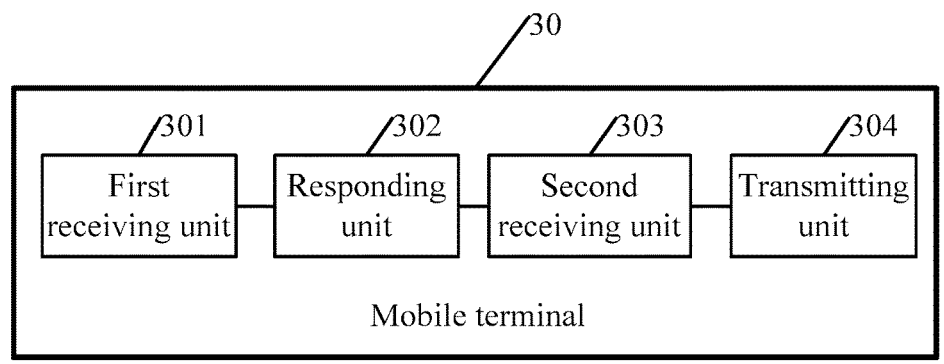
FIG. 3 is a block diagram illustrating a mobile terminal according to one embodiment of the present disclosure.

Please refer to FIG. 3. FIG. 3 is a block diagram illustrating a mobile terminal 30 according to one embodiment of the present disclosure. The mobile terminal 30 includes a first receiving unit 301, a responding unit 302, a second receiving unit 303, and a transmitting unit 304. Each of the units is detailed as follows.

The first receiving unit 301 is configured to receive a flight mode trigger command when the mobile terminal 30 accesses to the 2G network in data and voice call.

Specifically, the flight mode trigger command is completed in the operating system of the mobile terminal 30. With the second generation (2G) mobile communication technique, voice is digitally transmitted. In addition to the conversation function, the 2G mobile communication technique has a short message service (SMS) function. Some 2G network data also support data transmittance and fax but only for data with low transmittance, e.g. e-mails and small-size software, because of low speed. The method of accessing the network data with the 2G mobile communication technique includes but is not limited to an expenses card using the standard 2G network (such as the GSM card launched by China Mobile and China Unicom, and the CDMA card launched by China Telecom), an expenses card using the standard 3G network (such as the CDMA2000 card launched by China Telecom, the WCDMA card launched by China Unicom, and the TD-SCDMA card launched by China Mobile), 4G or other expenses cards with a more advanced communication technique to connect to the 2G network (the mobile phone is installed with the 2G network so that the higher standard 3G or 4G expenses cards can be connected to the 2G network). In addition, the 2G network can only be used in some remote or local areas. It costs much higher to establish the 3G or 4G network because few habitants are lived in these areas or these areas are naturally harsh.

A voice call includes daily communication connection via a telephone number or communication connection via similar principles. The flight mode trigger can be triggered by the user or automatically triggered once the relevant environmental data detected by the mobile terminal 30 reaches a predetermined value. Take a mobile phone equipped with the Android mobile phone for example, when the mobile phone is at the bright-screen state, some systematic functional icons appears as the user scrolls down the touch screen from top to bottom. One of the icons is a flight-shaped icon. The user touches the icon to generate a flight mode trigger command. One the other hand, the mobile terminal 30 is automatically triggered after the mobile terminal 30 detects relevant environment parameters and a flight mode trigger command is generated.

It is noted that receiving the flight mode trigger mode is performed after the 2G network data is turned on and the mobile terminal 30 is in conversation. At one scene, during the 2G network enabling, the user calls someone on his/her phone (or answers the phone) directly before manually disabling the 2G network. At this time, the mobile terminal 30 usually holds the 2G network data automatically. Specifically, the operating system instructs the modem to disable the 2G network but the operating system still labels the 2G network as enable. After the voice call is interrupted, the operating system enables the 2G network again immediately. Because the mobile phone is in conversation, the operating system still labels the 2G network as enable. So when the mobile phone is in conversation, the hold 2G network is connected. Afterwards, the user scrolls down the display screen without hanging up the mobile phone and touches the flight-shaped icon on the screen to generate a flight mode trigger mode. It is noted that, after receiving the flight mode trigger command, the operating system does not trigger the flight module enabling flight mode in the mobile terminal 30 immediately. Instead, some preparations for the flight module enabling flight mode are done. The specific preparations refer to the following blocks.

The responding unit 302 is configured to send a voice call interruption command to the modulator and demodulator (modem) in the mobile terminal 30 to interrupt the voice call with the modem in response to the flight mode trigger command.

The responding unit 302 responds the flight mode trigger command. The modem in the mobile terminal 30 is an analog-to-digital converter (ADC) module. When the data is sent by the computer, the digital signal is converted into an analog signal through the modem, which is called a "modulation" process. Before the modulated signal is sent to another computer through a telephone carrier wave, the modem in the receiver needs to return the analog signal to a digital signal recognized by the computer, which is called a "demodulation" process. Through a conversion from digital signal to analog signal by modulation and another conversion from analog signal to digital signal by demodulation, a remote communication between the two computers is realized.

The modem in the mobile terminal (such as a mobile phone) 30 is configured to control a wireless network communication module. For example, the modem controls connection and disconnection of the network, connection and disconnection of the voice call, and enablement and disablement of the flight mode. In block S102, after receiving the voice call interruption command sent by the operating system, the modem performs the voice call interruption and sends the message that interruption is successful to the operating system at the same time.

The second receiving unit 303 is configured to receive the voice call interruption message from the modem and to send a request to the modem to deactivate a packet data protocol (PDP).

Specifically, the packet data protocol (PDP) is deactivated by the modem. The voice call needs to be hung up before the PDP is successfully deactivated. The PDP fails to be deactivated whenever the modem asks the PDP to deactivate while the voice call is still turned on. Therefore, after a message notifying that the voice call is interrupted by the modem, the second receiving unit 303 sends a request of deactivating the PDP to the modem.

The transmitting unit 304 is configured to send a flight mode enabling command to the modem so that the modem can enable the flight mode of the mobile terminal 30 upon receiving the message from the modem notifying that the PDP is successfully deactivated.

Specifically, if the PDP fails to be deactivated (that is, the PDP resources is not released), the modem fails to enable the flight mode. Therefore, after receiving the message notifying that the PDP is successfully deactivated, the transmitting unit 304 sends the flight mode enabling command to the modem so that the modem can enable the flight mode for the mobile terminal. It is notified that, the flight mode is an operating mode that the mobile terminal 30 does not communicate with the outside completely. Such a design aims to prevent the communication signal for the mobile terminal 30 from bothering the flying airplane.

Preferably, the operating system adopted by the present disclosure is the Android operating system or any systems developed based on the Android operating system. The systems developed based on the Android operating system include, but are not limited to, the Mi operating system or the Meizu operating system. The Android operating system (or the systems developed based on the Android operating system) is a preferred embodiment. The iOS system or the Symbian system for the mobile terminal 30 may be adopted in this present disclosure. The same or similar technical effects can be achieved. Any systems adopting the method proposed by the present disclosure can achieve the same or similar technical effects and be within the protective scope of the present disclosure.

Figure 3A:
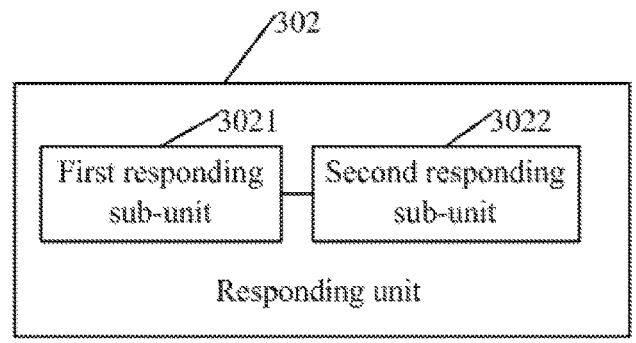
FIG. 3A illustrates a block diagram of the second receiving unit as shown in FIG. 3.

Please refer to FIG. 3A illustrating a block diagram of the second receiving unit 303 as shown in FIG. 3. The mobile terminal 30 includes a first receiving sub-unit 3031, a prompting sub-unit 3032, and a second receiving unit 3033. The sub-units are detailed as follows.

The first responding sub-unit 3021 is configured to prompt to input the voice call turn-off command in response to the flight mode trigger command.

The second responding sub-unit 3022 is configured to send the voice call interruption command to the modem in the mobile terminal 30 to interrupt the occupied voice call with the modem in response to the voice call turn-off command.

Figure 3B:
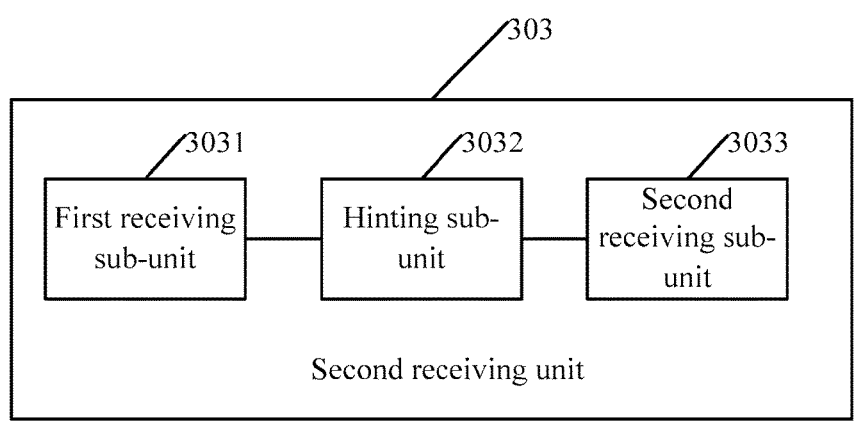
FIG. 3B illustrates a block diagram of the second receiving unit as shown in FIG. 3.

Please refer to FIG. 3B illustrating a block diagram of the second receiving unit 303 as shown in FIG. 3. The mobile terminal 30 includes a first receiving sub-unit 3031, a prompting sub-unit 3032, and a second receiving sub-unit 3033. The sub-units are detailed as follows.

The first receiving sub-unit 3031 is configured to receive the voice call interruption message sent by the modem.

The prompting sub-unit 3032 is configured to prompt to input a network disabling command.

The second receiving sub-unit 3033 is configured to receive the network disabling command input by the user and to send a request of deactivating the PDP to the modem in response to the network disabling command.

As for the mobile terminal 30 shown in FIG. 3, the user's flight mode trigger command is received when the mobile terminal 30 is accessed to the 2G network in data and voice call. At first, the operating system instructs the modem to cancel the conversation immediately. Next, after the interruption of the network is assured, the flight mode enabling command is sent to the modem through the operating system so that the modem can turn on the flight mode of the mobile terminal 30. In this way, the speed of enabling the flight mode is efficiently enhanced.

Further, the location of the mobile terminal 30 is obtained by means of the positing system installed in the mobile terminal 30 before the user's flight mode trigger command is received. Only when that the mobile terminal 30 is within the range of the airport is determined, the flight mode is turned on immediately. In this way, the user's experience is improved.

Figure 4:
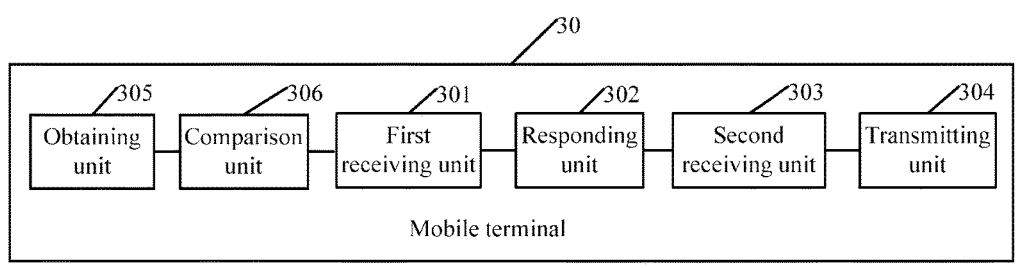
FIG. 4 is a block diagram illustrating another mobile terminal according to another embodiment of the present disclosure.

Please refer to FIG. 4. FIG. 4 is a block diagram illustrating another mobile terminal 30 according to another embodiment of the present disclosure. The mobile terminal 30 includes a first receiving unit 301, a responding unit 302, a second receiving unit 303, and a transmitting unit 304 as shown in FIG. 3. Moreover, the mobile terminal 30 further includes an obtaining unit 305 and a comparison unit 306. The obtaining unit 305 and a comparison unit 306 are detailed as follows.

The obtaining unit 305 is configured to obtain a geographical location of a mobile terminal 30 via the positing system installed in the mobile terminal 30.

Specifically, the positioning system embedded in the mobile terminal, such as the global positioning system (GPS), the BeiDou navigation satellite system, and the Galileo positioning system, is turned on to obtain the information on the geographical location of the mobile terminal. The positioning system is automatically turned on with the mobile terminal. Or, the positioning system is turned on by the user after the user is prompted.

Before or after the positioning system is turned on, the mobile terminal 30 is accessed to the 2G network and the voice call is in conversation. Yet, the mobile terminal 30 has to be accessed to the 2G network and in the voice call upon receiving the flight mode trigger command.

The comparison unit 306 is configured to determine whether the geographical location is the predetermined airport location.

Specifically, after the obtaining unit 305 obtains the location information, the comparison unit 306 compares the location information with the predetermined geographical locations of the airports around the area and determines whether the mobile terminal 30 is within the range of the airport. If the mobile terminal 30 is within the range of the airport, the first receiving unit 301 is triggered to receive the flight mode trigger command.

As for the mobile terminal 30 shown in FIG. 4, the user's flight mode trigger command is received when the mobile terminal 30 is accessed to the 2G network in data and voice call. At first, the operating system instructs the modem to cancel the conversation immediately. Next, after the interruption of the network is assured, the flight mode enabling command is sent to the modem through the operating system so that the modem can turn on the flight mode of the mobile terminal 30. In this way, the speed of enabling the flight mode is efficiently enhanced.

Further, the location of the mobile terminal 30 is obtained by means of the positing system installed in the mobile terminal 30 before the user's flight mode trigger command is received. Only when that the mobile terminal 30 is within the range of the airport is determined, the flight mode is turned on immediately. In this way, the user's experience is improved.

Figure 5:
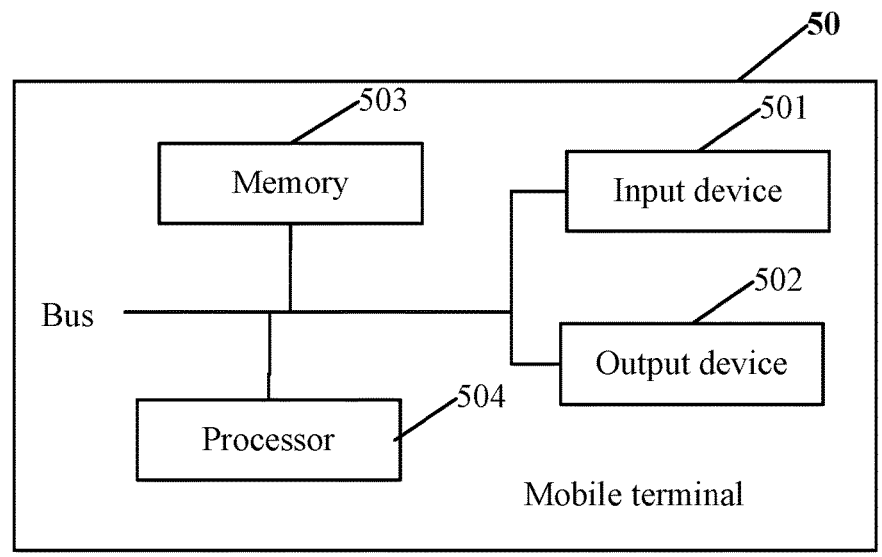
FIG. 5 illustrates a block diagram of a mobile terminal according to still another embodiment of the present disclosure.

Please refer to FIG. 5. FIG. 5 illustrates a block diagram of a mobile terminal 50 according to still another embodiment of the present disclosure. The mobile terminal 50 includes an input device 501, an output device 502, a memory 503, and a processor 504. One or a plurality of processor 504 may be used. In some embodiments of the present disclosure, the input device 501, the output device 502, the memory 503, and the processor 504 are connected through a bus or other methods. Take the components 501, 502, 503, 504 connected through a bus for example. The processor 504 executes the program instructions stored in the memory 503 to perform blocks as follows.

A flight mode trigger command is received with the input device 501 when the mobile terminal 50 accesses to the 2G network in data and voice call.

A voice call interruption command is sent with the output device 502 to the modulator and demodulator (modem) in the mobile terminal 50 to interrupt the voice call with the modem in response to the flight mode trigger command.

The voice call interruption message from the modem is received with the input device 501 and a request is sent to the modem to deactivate a packet data protocol (PDP) by the output device 502.

A flight mode enabling command is sent by the output device 502 to the modem so that the modem can enable the flight mode of the mobile terminal 50 upon receiving the message from the modem notifying that the PDP is successfully deactivated.

In one alternative embodiment, the operating system for the mobile terminal 50 is the Android operating system or an operating system developed based on the Android operating system.

In another alternative embodiment, when the processor 504 executes the program instructions to send a voice call interruption command via the output device 502 to the modulator and demodulator (modem) in the mobile terminal 50, to interrupt the voice call with the modem in response to the flight mode trigger command, the processor 504 executes the program instructions to perform the following operations:

a prompt of inputting the voice call turn-off command is generated in response to the flight mode trigger command;

the output device 502 sends the voice call interruption command to the modem in the mobile terminal 50 to interrupt the occupied voice call with the modem in response to the voice call turn-off command received by the input device 501.

In another alternative embodiment, the operation provided that the voice call interruption message from the modem is received with the input device 501 and a request is sent to the modem to deactivate a packet data protocol (PDP) by the output device 502, includes following operations:

The voice call interruption message sent by the modem is received with the input device 501;

prompt the user to input a network disabling command;

the network disabling command input by the input device 501 is received, and a request of deactivating the PDP is sent to the modem by the output device 502 in response to the network disabling command.

In another alternative embodiment, before receiving the flight mode trigger command via the input device 501, the processor 504 execute the program instructions to perform the following operations:

a geographical location of the mobile terminal 50 is obtained;

it is determined whether the geographical location is in a predetermined airport location; the flight mode trigger command is received upon the conditions that the mobile terminal 50 is within the range of the airport.

The description of the mobile terminal 50 can further refer to the description of the mobile terminal shown in FIG. 1 and FIG. 2 in the related embodiments. So the blocks are not detailed here.

Figure 6:
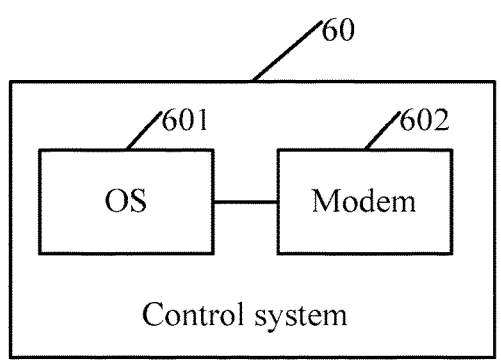
FIG. 6 is a block diagram illustrating the structure of a control system for a flight mode according to one preferred embodiment of the present disclosure.
Figure 7:
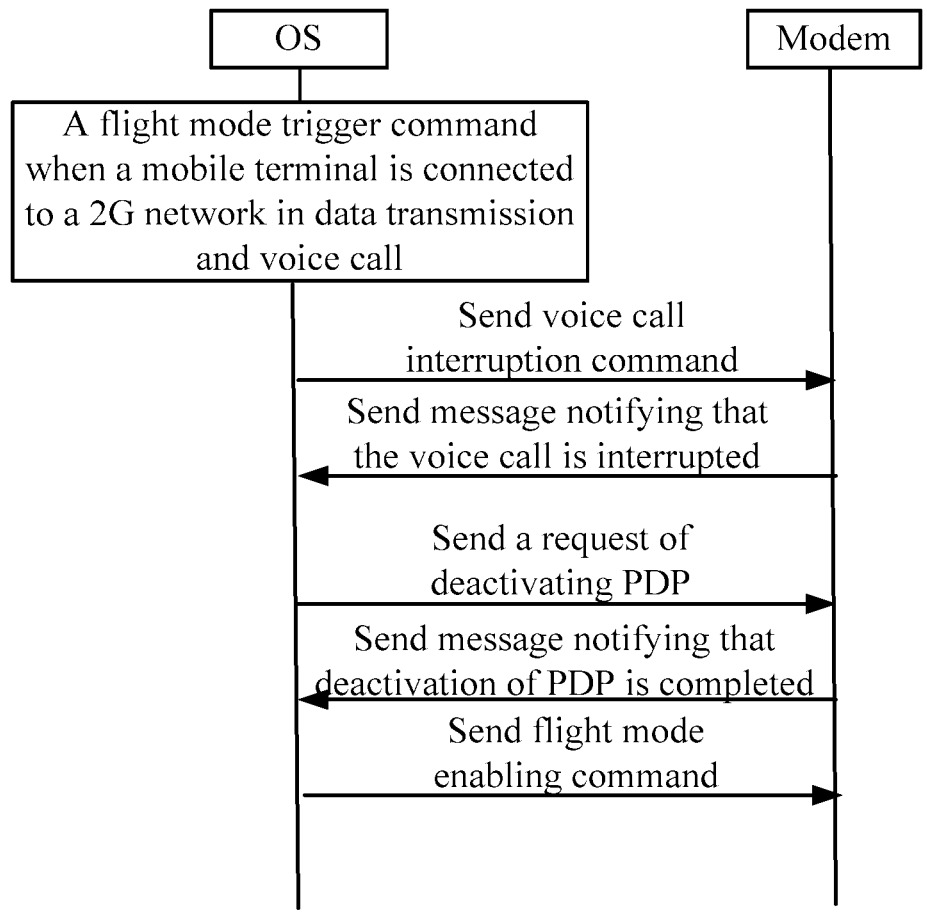
FIG. 7 illustrates interactions of the control system for the flight mode.

Please refer to FIG. 6 and FIG. 7. FIG. 6 is a block diagram illustrating the structure of a control system 60 for a flight mode according to one preferred embodiment of the present disclosure. FIG. 7 illustrates interactions of the control system 60 for the flight mode. The control system 60 includes an operating system 601 and a modulator and demodulator (modem) 602. The detailed interaction of the operating system 601 and the modem 602 is detailed as follows.

The operating system 601 receives the flight mode trigger command when the mobile terminal is connected to the second generation (2G) network in data and voice call.

The operating system 601 sends a voice call interruption command to the modem 602 in response to the flight mode trigger command.

After receiving the voice call interruption command, the modem 602 interrupts the voice call and sends the voice call interruption message to the operating system 601.

After receiving the voice call interruption message, the operating system 601 sends a request of deactivating a packet data protocol (PDP) to the modem 602.

The modem 602 deactivates the PDP based on the request of deactivating the PDP and sends the message notifying that deactivation of the PDP is completed to the operating system 601.

The operating system 601 sends the flight mode enabling command to the modem 602 after receiving the message notifying that deactivation of the PDP is completed.

The modem 602 turns on the flight mode of the mobile terminal in response to the flight mode enabling command.

In an alternative embodiment, the operating system 601 is the Android operating system or an operating system developed based on the Android operating system.

In another alternative embodiment, the operation provided that after receiving the voice call interruption message, the operating system 601 sends the request of deactivating the PDP to the modem 602, includes operations as follows.

The operating system 601 receives the voice call interruption message sent by the modem 602.

The operating system 601 prompt the user to input the voice call turn-off command.

The operating system 601 receives the network disabling command input by the user and sends the request of deactivating the PDP to the modem in response to the network disabling command.

Before the flight mode trigger command is received, another alternative further includes operations as follows.

The operating system 601 obtains a geographical location of a mobile terminal via the positioning system in the mobile terminal.

The operating system 601 determines whether the geographical location is the predetermined airport location. After determining the geographical location to be the predetermined airport location, the operating system 601 receives the flight mode trigger command.

It is notified that the description of the operating system 601 and the modem 602 can refer to the description of the operating system and the modem shown in FIG. 1 and FIG. 2 in the related embodiments. So the blocks are not detailed here.

In sum, according to the embodiment of the present disclosure, the user's flight mode trigger command is received when the mobile terminal is connected to the 2G network in data and voice call. At first, the modem is asked by the operating system to cancel the conversation immediately. Next, after the interruption of the network data is assured, the flight mode enabling command is sent to the modem through the operating system so that the modem 30 can turn on the flight mode of the mobile terminal. In this way, the speed of enabling the flight mode is efficiently enhanced.

Further, the location of the mobile terminal via the positing system installed in the mobile terminal is obtained before the user's flight mode trigger command is received. Only when that the mobile terminal is within the range of the airport is determined, the flight mode is turned on immediately. In this way, the user's experience is improved.

Through the description of the above embodiments, those of ordinary skill in the art can clearly understand that the present disclosure may be realized by using program instructions executable by associated hardware. The program instructions may be stored in a computer readable medium. When the program instructions are executed, the processes and blocks described in above embodiments are realized. The computer readable medium may include but is not limited to a random access memory (RAM), a read-only Memory (ROM), a compact disc read-only memory (CD-ROM), or some other optical disc storage, a magnetic disk storage medium, or some other magnetic storage device, or any other medium that can be hand carried or can store expected program code in a form of instruction or data and can be accessed by a computer. In addition, any connection may be the computer readable medium if appropriate.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:
1. A method of controlling a flight mode, comprising:
obtaining a geographical location of the mobile terminal;
determining whether the geographical location is within a predetermined airport location;
if the mobile terminal is within the predetermined airport location, receiving a flight mode trigger command when a mobile terminal is connected to a second generation (2G) network in data transmission and voice call;
sending a voice call interruption command to a modulator and demodulator (modem) in the mobile terminal in response to the flight mode trigger command so as to interrupt the voice call with the modem;
receiving a voice call interruption message sent by the modem and sending a request to the modem to deactivate a packet data protocol (PDP); and
sending a flight mode enabling command to the modem upon receiving a message from the modem notifying the PDP is successful deactivated, so that the modem enables a flight mode of the mobile terminal.

2. The method of claim 1, wherein an operating system installed in the mobile terminal is Android operating system or any systems developed based on the Android operating system.

3. The method of claim 1, wherein a step of sending the voice call interruption command to the modulator and demodulator (modem) in the mobile terminal in response to the flight mode trigger command so as to interrupt the voice call with the modem, comprises:
prompting to input a voice call turn-off command in response to the flight mode trigger command;
receiving the voice call turn-off command and sending the voice call interruption command to the modem in the mobile terminal in response to the voice call turn-off command so as to interrupt the voice call with the modem.

4. The method of claim 1, wherein a step of receiving the voice call interruption message sent by the modem and sending the request to the modem to deactivate the packet data protocol (PDP), comprises:
receiving the voice call interruption message sent by the modem;
prompting to input a network disabling command;
receiving the input network disabling command and sending the request to the modem to deactivate the PDP in response to the network disabling command.

5. A mobile terminal comprising:
an obtaining unit, configured to obtain a geographical location of the mobile terminal;
a comparison unit, configured to determine whether the geographical location is within a predetermined airport location;
a first receiving unit, configured to receive a flight mode trigger command when the mobile terminal accesses to a 2G network in data and voice call upon a condition that the mobile terminal is within the predetermined airport location;
a responding unit, configured to send a voice call interruption command to a modulator and demodulator (modem) in the mobile terminal to interrupt a voice call with the modem in response to the flight mode trigger command;
a second receiving unit, configured to receive a voice call interruption message from the modem and to send a request to the modem to deactivate a packet data protocol (PDP); and
a transmitting unit, configured to send a flight mode enabling command to the modem so that the modem enables a flight mode of the mobile terminal upon receiving the message from the modem notifying that the PDP is successfully deactivated.

6. The mobile terminal of claim 5, wherein an operating system installed in the mobile terminal is Android operating system or any systems developed based on the Android operating system.

7. The mobile terminal of claim 5, wherein the responding unit comprises:
a first responding sub-unit, configured to prompt at inputting a voice call turn-off command in response to the flight mode trigger command; and
a second responding sub-unit, configured to send the voice call interruption command to the modem in the mobile terminal to interrupt the occupied voice call with the modem in response to the voice call turn-off command.

8. The mobile terminal of claim 5, wherein the second receiving unit comprises:
   a first receiving sub-unit, configured to receive the voice call interruption message sent by the modem;
   a prompting sub-unit, configured to prompt to input a network disabling command; and
   a second receiving sub-unit, configured to receive the network disabling command and to send a request of deactivating the PDP to the modem in response to the network disabling command.

9. A mobile terminal comprising an input device, an output device, a memory, and a processor, the processor executing program instructions stored in the memory to perform operations of:
   obtaining a geographical location of the mobile terminal;
   determining whether the geographical location is within a predetermined airport location;
   if the mobile terminal is within the predetermined airport location, receiving a flight mode trigger command when a mobile terminal is connected to a second generation (2G) network in data transmission and voice call;
   sending, with the output device, a voice call interruption command to a modulator and demodulator (modem) in the mobile terminal in response to the flight mode trigger command so as to interrupt a voice call with the modem;
   receiving, with the input device, a voice call interruption message sent by the modem and sending, with the output device, a request to the modem to deactivate a packet data protocol (PDP); and
   sending, with the output device, a flight mode enabling command to the modem upon receiving a message from the modem notifying the PDP is successful deactivated, so that the modem enables a flight mode of the mobile terminal.

10. The mobile terminal of claim 9, wherein an operating system installed in the mobile terminal is Android operating system or any systems developed based on the Android operating system.

11. The mobile terminal of claim 9, wherein when the processor executes the program instructions to perform the operation of sending the voice call interruption command to the modulator and demodulator (modem) in the mobile terminal in response to the flight mode trigger command so as to interrupt the voice call with the modem, the processor executes the program instructions to perform operations of:
   prompting to input a voice call turn-off command in response to the flight mode trigger command;
   receiving the voice call turn-off command with the input device, and sending, with the output device, the voice call interruption command to the modem in the mobile terminal in response to the voice call turn-off command so as to interrupt the voice call with the modem.

12. The mobile terminal of claim 9, wherein when the processor executes the program instructions to perform the operation of receiving the voice call interruption message sent by the modem and sending the request to the modem to deactivate the packet data protocol (PDP), the processor executes the program instructions to perform operations of:
   receiving the voice call interruption message sent by the modem with the input device;
   prompting to input a network disabling command;
   receiving the input network disabling command with the input device, and sending the request to the modem to deactivate the PDP with the output device in response to the network disabling command.

* * * * *